United States Patent [19]
Dodd

[11] 3,948,369
[45] Apr. 6, 1976

[54] SYNCHRONOUS COUPLING

[76] Inventor: Ned Thurston Dodd, Rte. 2, Lula, Ga. 30554

[22] Filed: May 21, 1974

[21] Appl. No.: 471,991

[52] U.S. Cl. .................. 192/67 R; 64/10; 192/67 P; 192/99 S
[51] Int. Cl.² .......................................... F16D 11/04
[58] Field of Search ............... 192/67 R, 67 P, 99 S; 64/9 R, 10

[56] References Cited
UNITED STATES PATENTS

| | | | |
|---|---|---|---|
| 123,852 | 2/1872 | Youngs | 192/67 R |
| 355,267 | 12/1886 | Higgins, Jr. | 192/67 P |
| 527,632 | 10/1894 | Verity | 64/9 R |
| 2,679,735 | 6/1954 | Rowe | 64/9 R |
| 3,237,736 | 3/1966 | Siok | 192/67 R |
| 3,618,722 | 11/1971 | Eschenbach | 192/67 P |

FOREIGN PATENTS OR APPLICATIONS

| | | | |
|---|---|---|---|
| 665,340 | 1/1952 | United Kingdom | 192/67 R |

*Primary Examiner*—Allan D. Herrmann
*Attorney, Agent, or Firm*—B. J. Powell

[57] ABSTRACT

A coupling device for selectively connecting and disconnecting a driving shaft from a driven shaft which includes a driving flange carried by the end of the driving shaft and a driven flange opposed thereto carried by the end of the driven shaft. A drive pin assembly carried by the driven flange selectively engages a hole in the driving flange selectively alignable with the drive pin assembly to connect and disconnect the driving flange from the driven flange only when a prescribed relative rotational position exists between the driving shaft and the driven shaft. Also, means are provided for disconnecting the driving flange from the driven flange only when machinery driven by the driven shaft reaches a predetermined position. The method of operating of the device is also contemplated.

2 Claims, 9 Drawing Figures

U.S. Patent  April 6, 1976  Sheet 1 of 3  3,948,369
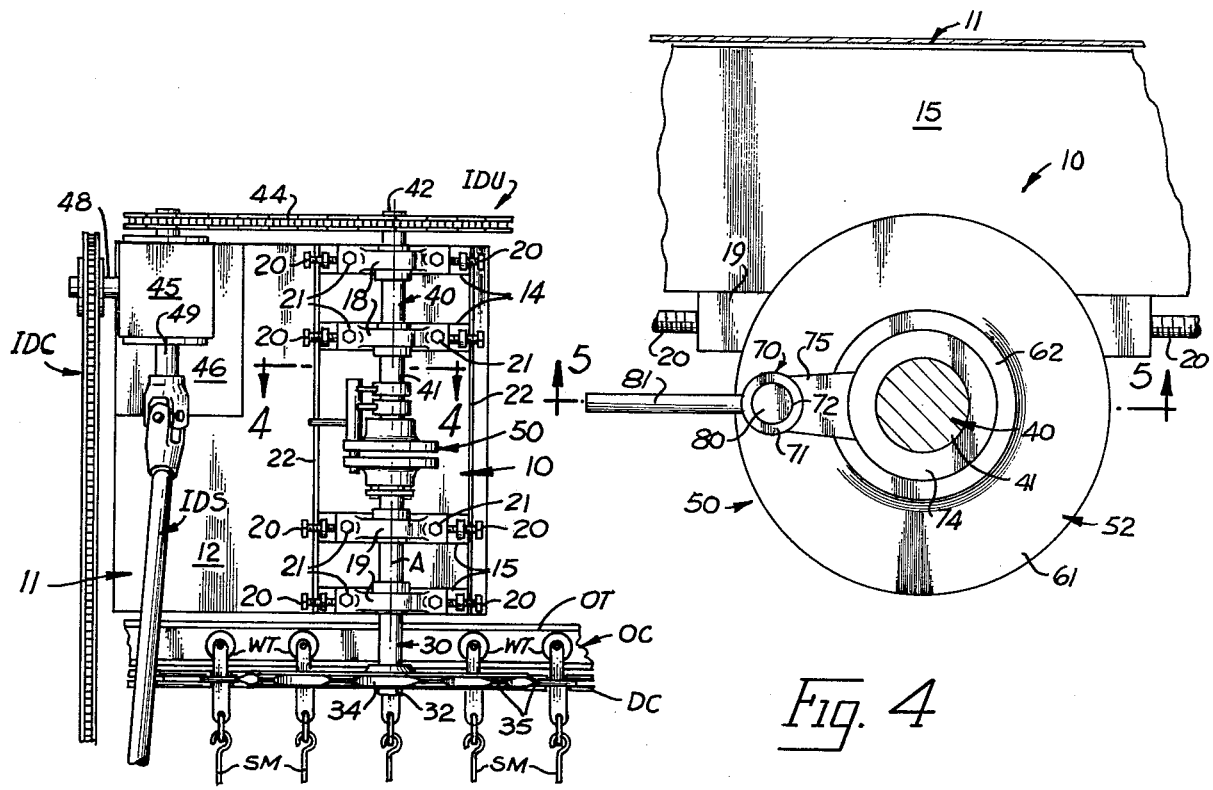
Fig. 1
Fig. 4
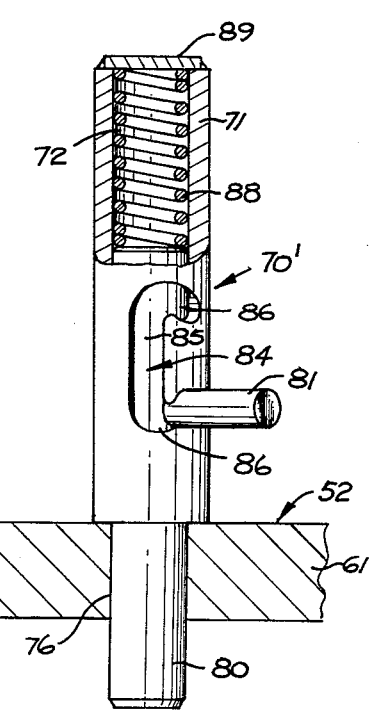
Fig. 6
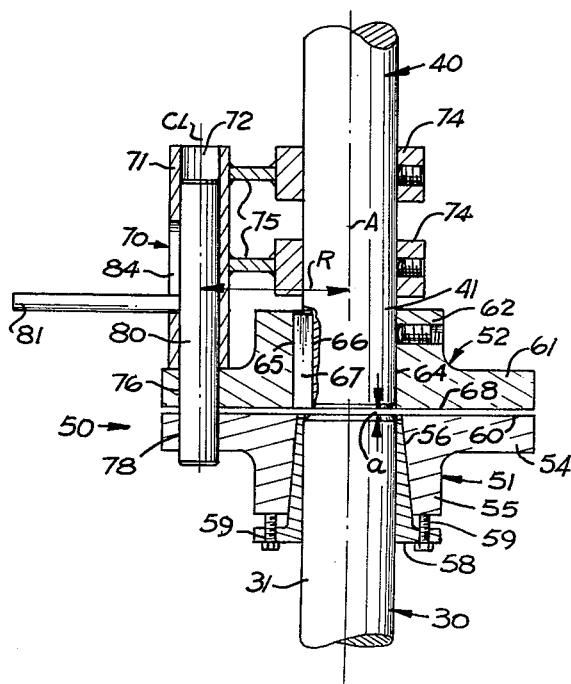
Fig. 5

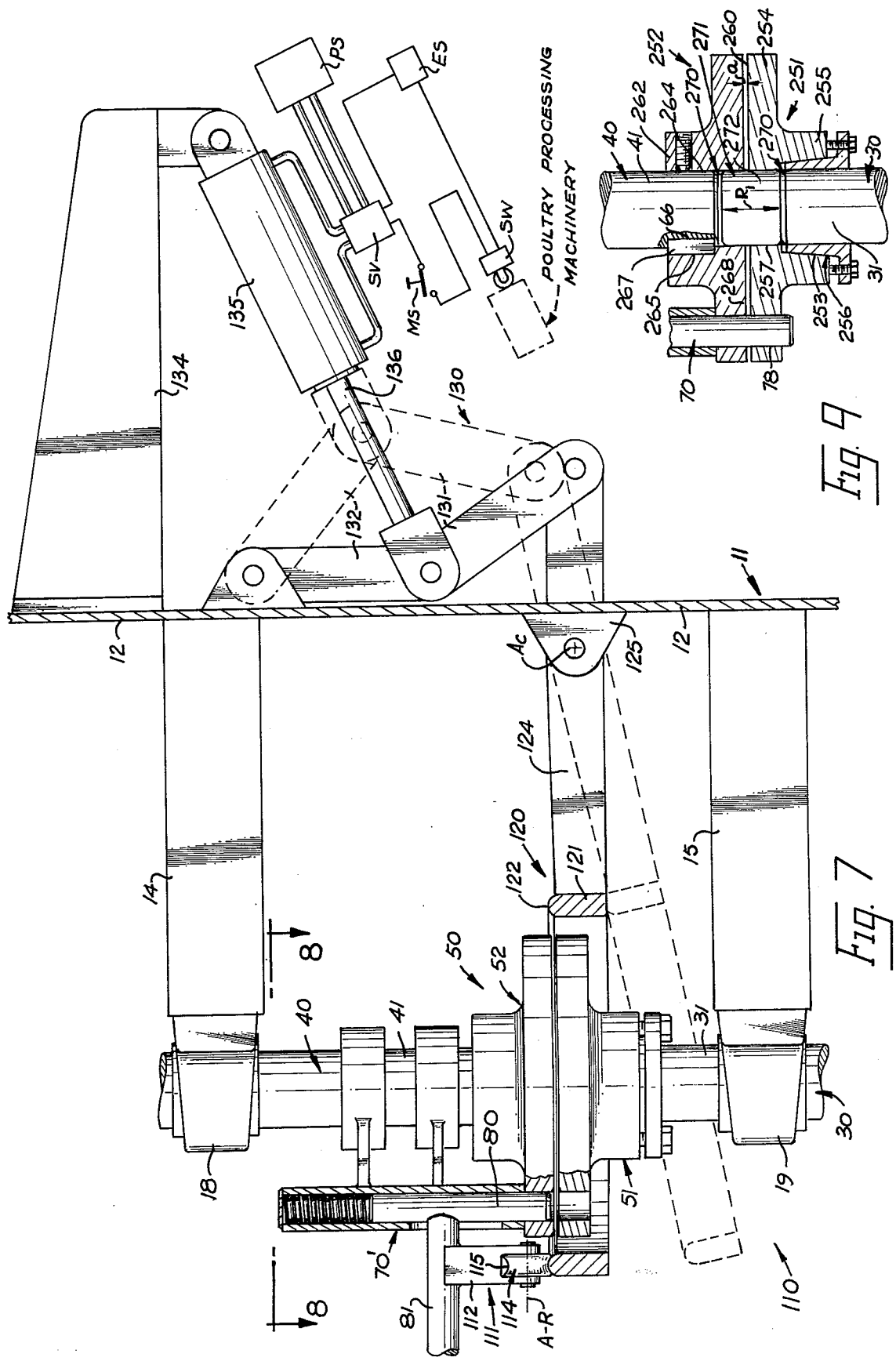

SYNCHRONOUS COUPLING

BACKGROUND OF THE INVENTION

It is frequently necessary to selectively connect a driving shaft to a driven shaft to drive the driven shaft. While various coupling devices are available to connect a driving shaft to a driven shaft, such devices have generally been unable to connect a driving shaft to a driven shaft so as to maintain a prescribed relative rotational position between the driving and driven shafts so as to maintain synchronization therebetween. This has been especially true in the poultry processing industry where the entire processing operation is controlled by the overhead conveyor which successively moves the poultry carrying shackles through the plant. Many times the overhead conveyor actually drives the processing equipment through an idler drive unit driven by the conveyor. Because of the required synchronization between the operation of the processing equipment and the overhead conveyor, this equipment has normally been permanently and drivingly connected to the overhead conveyor. Thus, when the processing equipment was not being used, it could not be disconnected which resulted in excessive wear and other damage to the equipment.

SUMMARY OF THE INVENTION

These and other problems associated with the prior art are overcome by the invention disclosed herein by providing a coupling device which is capable of connecting a driving shaft to a driven shaft while maintaining a predetermined relative rotational position between the driving and driven shafts. This maintains synchronization between the shafts even when repeatedly connected and disconnected. In a poultry processing plant where the overhead conveyor drives the driving shaft and the driven shaft drives the processing equipment, the invention allows the processing equipment to be connected to and disconnected from the conveyor without loss of synchronization therebetween.

The apparatus of the invention includes a driving shaft and a driven shaft coaxially arranged for rotation about a common axis. The adjacent ends of the driving and driven shafts are spaced apart a prescribed distance. Each of the adjacent ends of the shafts fixedly mounts a connector flange for rotation therewith with the connector flanges spaced apart a prescribed distance. A drive pin assembly is carried by one of said flanges which selectively engages a hole in the other flange to drivingly connect the flanges so that the relative rotational positions between the shafts is maintained. Where the poultry processing machinery has a prescribed cycle and the machinery would interfere with the operation of the overhead conveyor if the processing machinery was stopped at certain points in the cycle, means is provided for disengaging the drive pin assembly only a non-interfering position in the cycle.

These and other features and advantages of the invention disclosed herein will become more apparent upon consideration of the following specification and accompanying drawings wherein like characters of reference designate corresponding parts throughout the several views and in which:

BRIEF DESCRIPTION OF THE DRAWINGS

FIG. 1 is a front elevational view of one embodiment of the invention;

FIG. 4 is an enlarged cross-sectional view of the invention taken along line 4—4 in FIG. 1;

FIG. 5 is a cross-sectional view taken along line 5—5 in FIG. 4;

FIG. 6 is an enlarged view of a modified form of the drive pin assembly;

FIG. 7 is an enlarged axial cross-sectional view showing a second embodiment of the invention; and, FIG. 8 is a cross-sectional view taken along line 8—8 in FIG. 7; and, FIG. 9 is a cross-sectional view similar to FIG. 5 illustrating another modification of the invention.

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Referring to FIGS. 1–4 a first embodiment of the coupling device 10 is illustrated and is incorporated into an idler drive unit IDU driven by an overhead conveyor OC in a poultry processing plant. The output of the idler drive unit IDU is operatively connected to poultry processing machinery (not shown) such as an automatic lung remover Model ALR-2 or an automatic eviscerating machine sold by Gainesville Machine Company, Inc. of Gainesville, Ga. Such processing machinery usually has an input drive chain assembly IDC and an input drive shaft assembly IDS seen in FIG. 1. The overhead conveyor OC usually has an overhead tract OT which movably supports a plurality of wheeled trolley assemblies WT thereon for successive movement therealong. A flexible drive, here shown as a drive chain DC, connects the wheeled trolley assemblies WT and moves them successively along tract OT with a prescribed distance d between trolley assemblies WT. A shackle member SM partly shown in FIG. 1 is carried by each trolley assembly WT as is known in the art on which poultry (not shown) is carried for processing. Thus, it will be seen that the processing machinery must operate in synchronization with the movement of the shackle members SM in order to process the poultry carried thereby.

Figure 3:
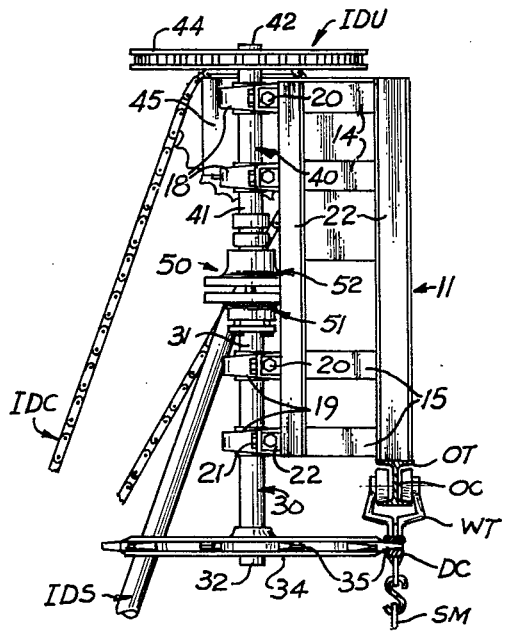
FIG. 3 is an end view of the invention of FIGS. 1 and 2.
Figure 2:
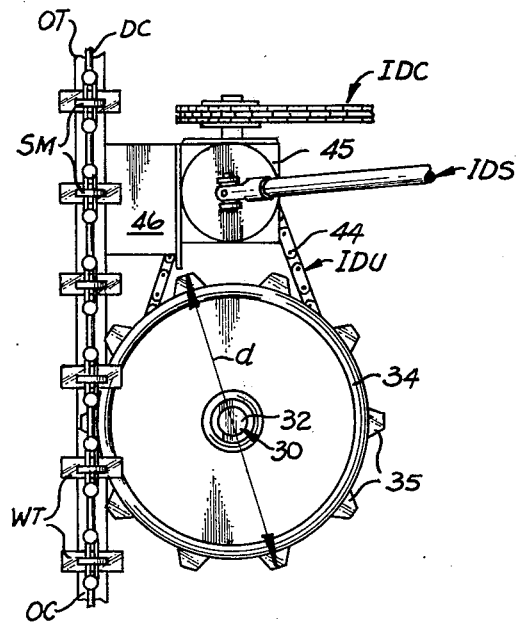
FIG. 2 is a bottom plan view of that embodiment of the invention seen in FIG. 1.

As best seen in FIGS. 1 and 2, the idler drive unit IDU which incorporates coupling device 10 includes a support frame 11 which has a generally rectilinear mounting surface 12 thereon usually arranged generally parallel to the plane of the shackle members SM or vertical. An upper pair of mounting bases 14 are mounted on frame 11 at surface 12 and project forwardly therefrom in alignment with each other. A lower pair of mounting bases 15 are generally vertically aligned with the bases 14 on mounting surface 12. Upper bearing blocks 18 are mounted on the upper mounting bases 14 and lower bearing blocks 19 are mounted on the lower mounting bases 15. Opposed adjusting screws 20 threadedly carried by the bases 14 and 15 are provided for laterally adjusting the bearing blocks 18 and 19 across the mounting bases 14 and 15 to align bearing blocks 18 and 19. Hold down bolts 21 selectively fix each of the bearing blocks 18 and 19 onto the mounting bases 14 and 15. Side plates 22 extend generally vertically along the outside edges of the mounting bases 14 and 15 on opposite sides thereof to reinforce same.

A lower driving shaft 30 is rotatably journalled in the lower bearing blocks 19 and extends generally vertically along a common axis A. The upper driving end 31 of shaft 30 terminates between the lower bearing blocks 19 and the upper bearing blocks 18. The lower end 32 of shaft 30 mounts an idler drive sprocket 34 thereon which lies in a plane generally normal to the plane of shackle members SM and the common axis A but in alignment with the drive chain DC of the overhead conveyor OC so that the drive teeth 35 on the idler drive sprocket 34 drivingly engage the drive chain DC of the conveyor OC. Thus, as the drive chain DC is moved past the periphery of the idler drive sprocket 34, sprocket 34 is rotated thereby driving the driving shaft 30. It will be noted that the diameter D of the idler drive sprocket 34 is such that a prescribed number of the wheeled trolley assemblies WT past thereby during each revolution of the idler drive sprocket 34.

A driven shaft 40 is rotatably journalled in the upper bearing blocks 18 and is oriented generally vertical for rotation about common axis A coaxially with the driving shaft 30. The driven shaft 40 has a driven end 41 which is adjacent to and in alignment with the driving end 31 of shaft 30 and spaced therefrom a prescribed distance a. The upper output end 42 of driven shaft 40 is drivingly connected to a transfer chain and sprocket arrangement 44 which in turn drives a transfer case 45 mounted on a base 46 carried by frame 11. The transfer case 45 has a pair of output shafts 48 and 49 with shaft 48 drivingly connected to the input drive chain assembly IDC of the poultry processing machinery and the output shaft 49 drivingly connected to the input drive shaft assembly IDS of the poultry processing machinery. There is a correspondence between the rotation of output shafts 48 and 49 and the idler sprocket 34 so that a prescribed cycle of the poultry processing machinery is produced during each revolution of sprocket 34 as will be apparent.

The coupling device 10 includes an interconnecting assembly 50 operatively connecting the driving end 31 of shaft 30 to the driven end 41 of shaft 40. The interconnecting assembly 50 comprises a driving flange 51 mounted on the driving end 31 of driving shaft 30 and a driven flange 52 mounted on the driven end 41 of driven shaft 40 of the flange 51. Driving flange 51 includes a circular driving disk 54 and a boss 55 extending outwardly from one side of disk 54. A central bore 56 is provided through disk 54 and boss 55 for use in mounting flange 51 on the end 31 of driving shaft 30. It will be noted that central bore 56 is tapered so that a locking wedge 58 can be forced thereinto to lock the driving flange 51 onto the end 31 of shaft 30 as the bolts 59 are tightened as best seen in FIG. 5. Such a locking device is well known in the art. It will be noted that the driving disk 54 is oriented generally normal to the common axis A of shaft 30 and defines a driving surface 60 which faces the driven flange 52 normal to the axis A. This allows the rotational position of flange 51 to be shifted with respect to the shaft 30 to initially orient the driving and driven flanges as will become more apparent.

The driven flange 52 includes a driven disk 61 with a boss 62 on one side thereof. A central bore 64 is defined through the driven disk 61 and boss 62 which receives the driven end 41 of driven shaft 40 therein. A keyway 65 is provided in flange 52 at bore 64 which, in combination with a like keyway 66 in the driven end 41 of shaft 40, mounts a key 68 to positively connect the flange 52 to the driven end 41 of shaft 40. The driven disk 61 is also arranged generally normal to the common axis A of the shafts 30 and 40 and defines a driven surface 68 facing the driving flange 51 which is generally parallel to the driving surface 60 on flange 51. It will thus be noted that the driving surface 60 and driven surface 68 are spaced apart the prescribed distance a.

A drive pin assembly 70 is carried by the driven end 41 of shaft 40 and the driven flange 52. The drive pin assembly 70 selectively and drivingly connects the driven flange 52 with the driving flange 51 so that the shafts 30 and 40 rotate together. The drive pin assembly 70 includes a tubular housing 71 defining a cylindrical passage 72 therethrough. The tubular housing 71 is fixed to the off side, here illustrated as the top side of driven disk 61, at a point spaced from the axis A a prescribed radial distance R. The lower end of housing 71 is fixedly attached to the disk 61 and the upper end thereof is held in a spaced apart relationship from the driven end 41 of shaft 40 by a pair of collars 74 and spacers 75 so that the centerline CL of the passage 72 through housing 71 is radially spaced from the common axis A and parallel thereto. A driven hole 76 is provided through the driven disk 61 in alignment with the passage 72 through housing 71. A drive hole 78 is provided through the driving disk 51 and radially spaced from the common axis A the radial distance R so that the holes 76 and 78 are alignable. The diameters D of holes 76 and 78 are equal to the diameter of passage 72 through housing 71.

A cylinder drive pin 80 is slidably received in the passage 72 in housing 71 and has a diameter sufficient to be just slidably received through the driven hole 76 and the drive hole 78. Thus, when the drive pin 80 protrudes through the hole 78 in the driving flange 51, it will be seen that the driven flange 52 will be driven with flange 51 thereby driving the driven shaft 40.

A handle 81 protrudes laterally outward from the cylindrical drive pin 80 and is fixedly attached thereto so that handle 81 can be manually engaged to raise and lower the drive pin 80. Handle 81 projects through an appropriate slot 84 in housing 71 to allow the handle 81 and driven pin 80 to be raised and lowered. The slot 84 is best illustrated in FIG. 6 where the slot has a generally vertical section 85 along which the handle 81 can be raised and lowered and offset latching sections 86 at opposite ends thereof so that the handle 81 can be latched into its lowered or raised positions. Thus, it will be seen that the handle 81 can be raised carrying the drive pin 80 therewith within housing 71 to disengage the drive pin 80 from the hole 78 in the driving flange 51. This disconnects the driven shaft 40 from the drive shaft 30 so that the drive shaft 30 is free to rotate moving the driving flange 51 therewith without rotating the driven shaft 40. When the handle 81 is moved into the upper offset latching section 86 of slot 84, the handle 81 will be retained in its raised position so that the driven shaft will be disengaged from the drive shaft 30. When it is desirable to re-engage the drive pin 80 with the drive hole 78 in the driving flange 51, the handle 81 is moved out of the upper offset latching section 86 of slot 84 and, if the drive pin assembly 70 is vertically oriented as seen in FIGS. 1 and 5, the weight of the pin 80 will cause the pin to drop onto the driving surface 60 of flange 51 and move therealong until it realigns with hole 78 in the flange 51 and drops therein to again drivingly engage the driving flange 51 so that the driven flange 52 will be rotated therewith to drive the driven shaft 40. Because there is only one hole 78 in the driving flange 51, the driven flange 52 will always be reconnected to the driving flange 51 in the same relative rotation between the shafts 30 and 40. Also, because the diameter D of the idler drive sprocket 34 is such that a prescribed number of the wheeled trolleys WT move thereby upon each revolution of the idler sprocket 34, the poultry processing machinery (not shown) will always be reconnected to the overhead conveyor OC in synchronization therewith.

Referring to FIG. 6, an alternate embodiment of the driven pin assembly, designated 70' is illustrated. Those components of the drive pin assembly 70' that are the same as those of the drive pin assembly 70 have like reference numbers applied thereto. The drive pin assembly 70' is for use where the drive pin 80 is not vertically aligned so that its weight will cause the pin 80 to re-engage the drive hole 78. The difference between the drive pin assembly 70' and the drive pin assembly 70 is that drive pin assembly 70' includes a coil spring 88 carried between an abuttment 89 on that end of housing 71 opposite the end from which the drive pin 80 protrudes and that end of the drive pin 80 opposite that which engages the driving flange 51. Thus, it will be seen that the orientation of the drive pin assembly 70' has no effect on its operation.

SECOND EMBODIMENT

Figure 8:
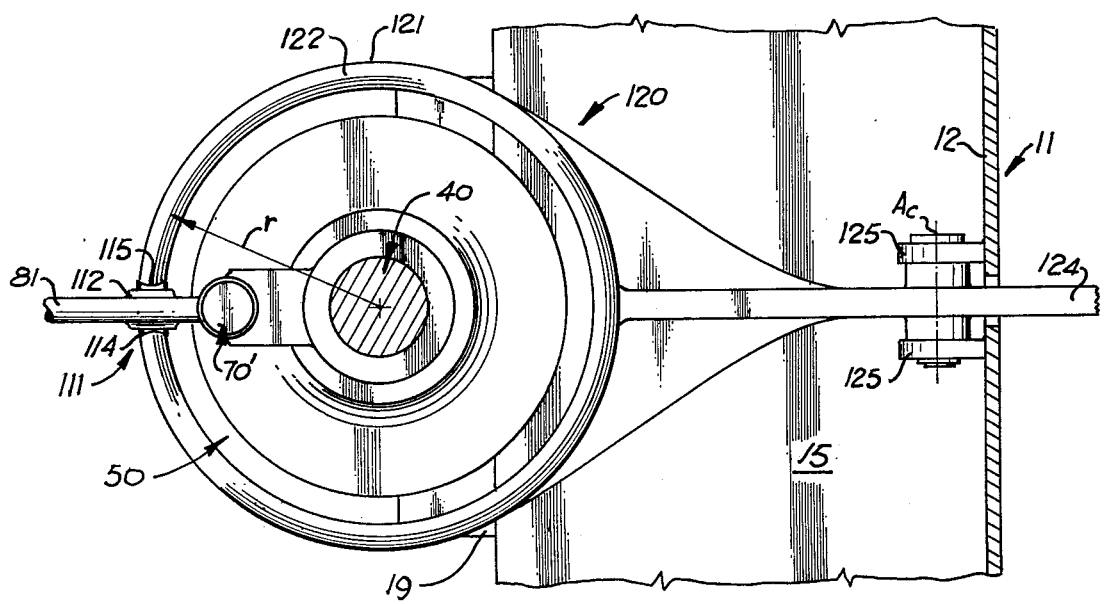

Frequently, poultry processing machinery which is associated with an overhead conveyor in a poultry processing plant has an initial position where the machinery does not interfere with the operation of the overhead conveyor and various operating positions in which the machinery would interfere with the operation of the overhead conveyor if the machinery does not operate while the overhead conveyor continues to operate. Therefore, it is desirable to disconnect the idler drive unit driving the poultry processing machinery from the overhead conveyor in this initial position. An alternate embodiment of the coupling device designated 110 is illustrated in FIGS. 7 and 8 which has the capability of disconnecting the poultry processing machinery from the overhead conveyor OC only when the processing machinery is in its initial non-interfering position. Those components of the coupling device 110 which are the same as the components of the coupling device 10 has the same reference numbers applied thereto.

Basically, the differences between the device 110 and the device 10 is that the device 110 has a cam follower on the handle 81 associated with drive pin 80 and a cam associated with the cam follower which is selectively positionable to cause the drive pin 80 to disengage the drive hole 78 and the driving flange 51. The annular cam is shifted to cause the drive pin 80 to disengage the driving flange 51 when the processing machinery reaches its initial non-interfere position.

Referring now specifically to FIG. 7, it will be seen that the handle 81 on the drive pin 80 mounts a cam follower assembly 111 therin which depends below the handle 81. The cam follower assembly 111 includes a mounting bracket 112 carried by the handle 81 which rotatably mounts a cam follower roller 114 for rotation about an axis A-R which radially extends from the common axis A of the shafts 30 and 40 generally perpendicular thereto. The cam follower roller 114 defines a concave recess 115 in the periphery thereof as will become more apparent. Thus, it will be seen that the cam follower roller 114 moves about a circular path concentrically about the common axis A of the shafts 30 and 40 with a radius $r$ from the common axis A.

A cam assembly 120 is mounted on the mounting frame 11 for pivotal movement about an axis A-C for selectively moving the cam follower roller 114 to cause the drive pin 80 to engage and disengage the driving flange 51. The cam assembly 120 includes an annular cam 121 defining a circular camming edge surface 122 which has a configuration to fit within the concave recess 115 of the cam follower roller 114. The annular cam 121 has a mean radius $r$ equal to the radius of the path of the cam follower roller 114. A support extension 124 is mounted on the annular cam 121 and extends therefrom to support the annular cam 121. The support extension 124 is pinned between a pair of mounting brackets 125 carried by the mounting frame 11 intermediate the ends of the support extension 124 so that the annular cam 121 is positioned along the path through which the cam follower roller 114 is moved. The distance between the axis A-C and the common axis A of the shafts 30 and 40 is such that the annular cam 121 remains substantially in alignment with the circular path along which the cam follower 114 moves. The remote end of support extension 124 is engaged by a positioning assembly 130 which causes the annular cam 121 to be shifted with respect to the flanges 51 and 52 so that the cam 121 engages the cam follower roller 114 to lift the drive pin 80 from the driving hole 78 and flange 51 or releases same for reengagement with the drive hole 78.

The positioning assembly 130 includes a drive link 131 pinned to the remote end of the support extension 124 at one of its ends and pinned to a positioning link 132 at the other of its ends. The other end of the positioning link 132 is pinned to a mounting bracket 134 carried by the frame 11. A drive cylinder 135 which is pivotally mounted on the mounting frame 11 has its piston rod 136 pinned to the joint between the drive link 131 and the positioning link 132. Thus, it will be seen that as the piston rod 136 is retracted, the annular cam 121 will be lowered away from the cam follower roller 114 to allow the drive pin 80 to engage the hole 78 and the driving flange 51 to cause the driven shaft 40 to be driven by the drive shaft 30. As the piston rod 136 is extended, it will be seen that the annular cam 121 will be lifted into engagement with the cam follower roller 114 to lift the drive pin 80 out of engagement with the drive hole 78 of the driving flange 51 to disconnect the driven shaft 40 from the drive shaft 30. The configuration of the drive link 131 and positioning link 132 is such that the links 131 and 132 pass through a straight line connecting the pivot point of the positioning link 132 with the frame 11 and the pivot point between the drive link 131 and the remote end of extension 124 as the piston rod 136 is extended and retracted. It will also be noted that the positioning link 132 bears against the mounting frame 11 when the annular cam 121 is in its raised position. Thus, it will be seen that the links 131 and 132 normally latch when the annular cam 121 is raised so that the drive cylinder 135 must be reactivated to transfer the annular cam 121 to its lowered or disengaged position. The weight of the drive cam 121 causes the cam assembly 120 to remain latched in its disengaged position until the drive cylinder 135 is again reactivated to transfer the annular cam 121 back to its engaged or raised position.

The drive cylinder 135 is a double acting cylinder which is connected to a fluid pressure source PS through a solenoid valve SV. Solenoid valve SV has two positions, one in which the piston rod 136 is extended and the other in which the piston rod 136 is retracted. The solenoid valve SV is operatively connected to a position sensing switch SW mounted on the poultry processing machinery as seen schematically in FIG. 7 so that the switch SW is operated when the poultry processing machinery reaches its initial non-interfering position. The solenoid valve SV is operatively connected to the switch SW through a manually operated disconnect switch MS to an electrical power source ES so that when the switch MS is closed, the solenoid valve SV will be energized upon operation of the switch SW when the poultry processing machinery reaches its initial non-interfering position to cause the piston rod 136 to extend and raise the annular cam 121 which in turn engages the cam follower roller 114 to disengage the driven pin 80 from the driving flange 51 so that the poultry processing machinery is no longer driven and is in its initial non-interfering position. This allows the overhead conveyor OC to continue to operate without interfering with the poultry processing machinery. When it is desirable to reconnect the poultry processing machinery to the overhead conveyor, the switch MS is opened so that the solenoid valve SV causes the piston rod 136 to retract to lower the annular cam 121 out of engagement with the cam follower roller 114 to allow the drive pin 80 to drop onto the driving surface 60 and then drop into the drive hole 78 in the driving flange 51 to reconnect the driven shaft 40 with the drive shaft 30 and again power the poultry processing machinery. Because there is only one hole 78 in the driving flange 51 as already explained, synchronization between the poultry processing machinery and the overhead conveyor is maintained.

Referring to FIG. 9, a second modification of the interconnecting assembly is illustrated and designated 250. The assembly 250 is designed for high torque loads and includes a driving flange 251 on the driving end 31 of shaft 30 and a driven flange 252 on the driven end 41 of shaft 40.

Driving flange 251 includes a circular driving disk 254 and a circular boss 255 concentrically with disk 254 and extending outwardly from one side of disk 254. A stepped central bore 256 is provided through disk 254 and boss 255 for use in mounting flange 251 on the driving end 31 of driving shaft 30. It will be noted that the central bore 256 has a tapered section 253 so that a locking wedge 258 can be forced thereinto to lock the driving flange 251 onto the end 31 of shaft 30 as bolts 259 are tightened. It will also be noted that the central bore 256 is provided at its opposite end with a cylindrical bearing section 257 as will become more apparent. The operation of the locking wedge 258 is well known in the art. It will further be noted that the driving disk 254 is oriented normal to the common axis A of shaft 30 and defines a driving surface 260 which faces the driven flange 251 normal to the axis A to allow the driving flange 251 to be oriented initially with respect to the driven flange 252.

The driven flange 252 includes a driven disk 261 with a boss 262 on one side thereof. A central bore 264 is defined through the driven disk 261 and boss 262 which receives the driven end 41 of driven shaft 40 therein. A keyway 265 is provided part of the way through flange 252 at bore 264 which, in combination with the like keyway 66 and the driven end 41 of shaft 40, mounts a key 268 to positively connect the flange 252 to the driven end 41 of shaft 40. It will also be noted that the shaft 40 extends only partly through the central bore 264 as will become more apparent. The driven disk 261 is also arranged generally normal to the common axis A and defines a driven surface 268 facing the driving surface 260 and generally parallel thereto. It will thus be noted that the driving surface 260 and the driven surface 268 are spaced apart the prescribed distance a but the ends 31 and 41 of shafts 30 and 40 are spaced apart a prescribed distance $a_1$.

Because the driving shaft 30 extends only partly through the central bore 256 of flange 251 and the driven shaft 40 extends only partly through the central bore 264 of the driven flange 252, opposed bearing recesses 270 are provided in both central bore 256 of driving flange 251 and central bore 264 of driven flange 252 which face each other and are coaxially aligned. A cylindrical bearing plug 271 is received in the recesses 270 so that the plug 271 can rotate independently of either driving flange 251 or driven flange 252. It will be noted that the bearing plug 271 defines an outside cylindrical bearing surface 272 with a diameter $d_2$ slightly less than the diameters of bores 256 and 264 and that the plug 271 has a length $l_1$ slightly shorter than the combined length of each of the recesses 270 and the distance a between the flanges 251 and 252. Because the force transmitted from the driving flange 251 to the driven flange 252 through the drive pin assembly 70 carried by the driven flange 252 and selectively engaging the driving hole 78 in the driving flange 251 as hereinbefore described is offset with respect to the common axis A, the plug 271 is able to absorb the side load of this arrangement. Thus, the flexing of the ends of shafts 30 and 40 is reduced especially if a sudden load is imposed on the system.

While specific embodiments of the invention have been disclosed herein, it is to be understood that full use may be made of modifications, substitutions, and equivalents without departing from the scope of the invention as disclosed herein.

I claim:

1. A coupling device for connecting driving machinery to driven machinery wherein the driven machinery has an initial non-interfering position in which the driven machinery will not interfere with the operation of the driving machinery if the driven machinery is disconnected from the driving machinery comprising:
   support means;
   a driving shaft rotatably mounted on said support means about a common rotational axis and having an adjacent end;
   a driven shaft rotatably mounted on said support means about said common rotational axis coaxially with said driving shaft and having an adjacent end opposed to and spaced from the adjacent end of said driving shaft; and,
   interconnecting means for selectively connecting the adjacent ends of said driving and driven shafts only at a prescribed relative rotational position between said driving shaft and said driven shaft to maintain synchronous movement therebetween, said interconnecting means including:

a first member fixably mounted on the adjacent end of one of said shafts, said first member defining a driving surface thereon generally normal to said common axis and facing the other of said shafts and further defining a hole opening onto said driving surface:

a drive pin assembly mounted on the adjacent end of the other of said shafts for rotation therewith, said driving pin assembly comprising a housing defining a passage therethrough and having a centerline generally parallel to said common axis and radially spaced therefrom so that said passage is selectively registrable with said hole in said first member, a drive pin slidably carried in said passage in said housing for selective extension from said housing into said hole in said first member and retraction into said housing from said hole in said first member, and means for urging said drive pin toward said first member;

an annular cam selectively positionable about said driving and driven shafts concentrically about said common axis and defining an annular camming surface thereon;

a positioning assembly connected to said drive pin for selectively moving said drive pin out of engagement with said hole in said first member, said positioning assembly including cam follower means rotatable with said drive pin assembly concentrically about said common axis and a positioning member connecting said cam follower means to said drive pin, said positioning member comprising a handle fixed perpendicular to said drive pin, and said cam follower means including a support member connected to said positioning member and a cam follower roller rotatably mounted on said support member adapted to rotatably engage said camming surface of said annular cam, said support member fixed perpendicular to said handle and comprising a mounting bracket for said cam follower roller;

positioning means for selectively moving said annular cam into engagement with said cam follower means on said positioning member to selectively urge said drive pin out of engagement with said hole in said first member as said cam follower means rides along camming surface of said annular cam; and, sensing means operatively connected to said positioning means to prevent said positioning means from moving said annular cam into engagement with said cam follower means to disconnect said drive pin from said hole in said first member until the driven machinery reaches its initial noninterfering position.

2. The coupling device of claim 1 further including bearing means operatively connecting said adjacent end of said driving shaft with said adjacent end of said driven shaft to maintain substantial alignment between said ends of said shafts while allowing rotation of said ends of said shafts independently of each other.

* * * * *